United States Patent
Ticknor

[15] 3,684,272
[45] Aug. 15, 1972

[54] CONFORMABLE FENDER
[72] Inventor: William C. Ticknor, Whittier, Calif.
[73] Assignee: Byron Jackson, Inc., Long Beach, Calif.
[22] Filed: Nov. 18, 1970
[21] Appl. No.: 90,553

[52] U.S. Cl. ................................................267/140
[51] Int. Cl. ................................................F16f 1/36
[58] Field of Search ............267/140; 114/219; 61/48

[56] References Cited

UNITED STATES PATENTS 3,473,836  10/1969  Halter ........................267/140
3,261,320  7/1966  Leonard ....................114/219

Primary Examiner—James B. Marbert
Attorney—Donald W. Banner, William S. McCurry and John W. Butcher

[57] ABSTRACT

A device for absorbing the impact between convergent and contiguous bodies due to relative movement therebetween, the device being conformable and weldable to the surface, either flat or contoured, of one of the bodies for resilient contact with the opposing body to cushion the blows of collision, dragging, or scuffing, and thus also alleviating damage to the bodies.

10 Claims, 9 Drawing Figures

INVENTOR
WILLIAM C. TICKNOR
BY John O. Evans, Jr.
ATTORNEY

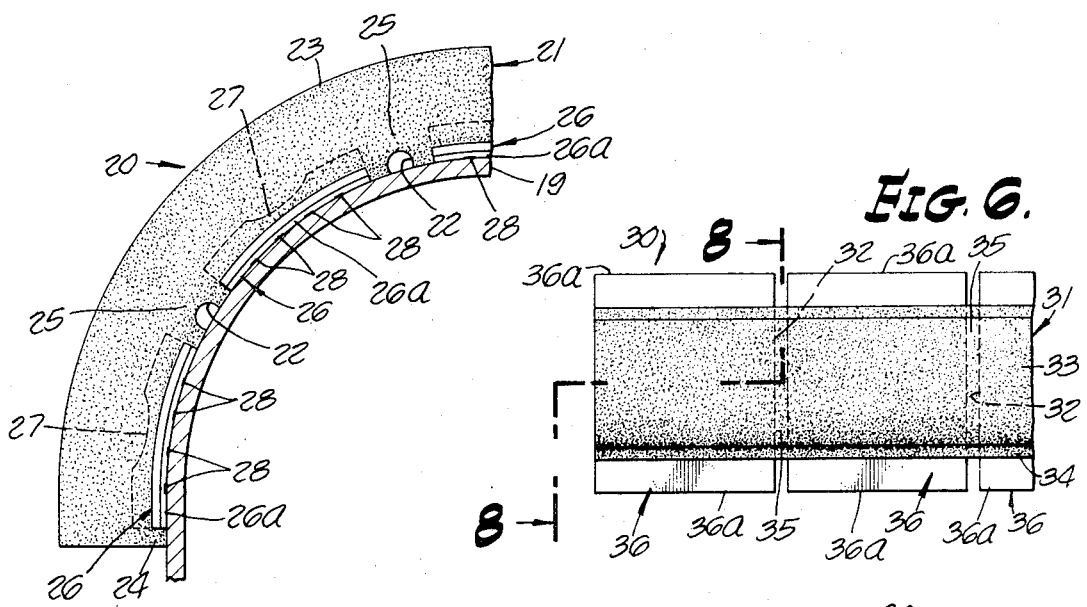
FIG. 5.
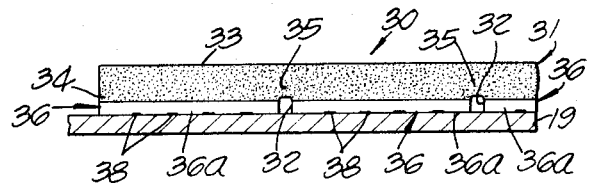
FIG. 6.
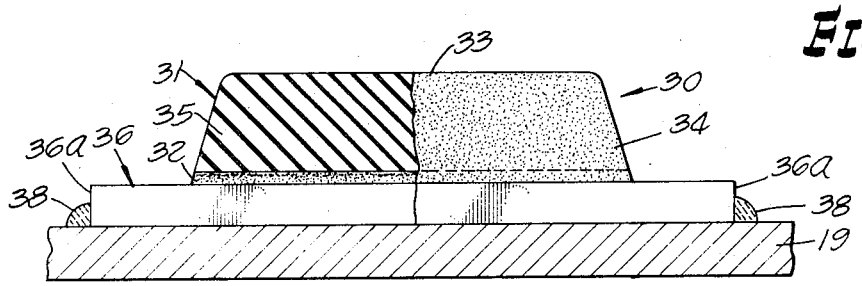
FIG. 7.
FIG. 8.
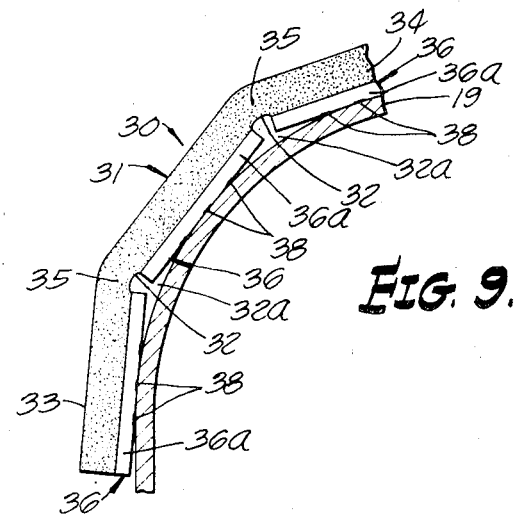
FIG. 9.
INVENTOR
WILLIAM C. TICKNOR
BY
John O. Evans, Jr.
ATTORNEY

CONFORMABLE FENDER

BACKGROUND OF THE INVENTION

1. Field of the Invention

This invention relates to fender or bumper pads having elastomeric resilient means, such as rubber, which are used to fend or preclude excessive shock on bumping, collision, or contact of two bodies, such as between a truck and a loading dock or curb, a boat and a pier or wharf, a boat and a barge, two boats, or other moving or converging bodies, the fenders being attached to one of the bodies, or both of them may be equipped with fenders. The invention relates more particularly to fenders or fender pads used on the curved hull of a boat or ship, where the impacts with barges, piers or wharves may be quite severe due to wave motion and forward speed on impact.

2. Description of the Prior Art

Fenders or bumper pads are extant in the prior art, such as disclosed, for example, in U.S. Pat. No. 3,411,304 issued Nov. 19, 1968 to R. B. Miller. The latter fender, however, provides bendable flaps that are a part of the plastic body of the fender, which is attached to a surface such as wood by driving nails through the flaps into the surface. Applicant's device, on the other hand, has spaced rigid metal plates bonded to an elastomeric pad with flexible sections between adjacent plates so that it provides a strong conformable fender which may be attached by welding the outer ends of the plates to a metal surface. Deficiencies of ship fenders of the prior art have been non-formability to the contours of the hulls of ships, lack of ruggedness of those which were made bendable to conform to the shape of the bow, and ineffective securing means. For example, the use of nails, as in wooden ships, or bolts, as in metal hulled ships, always leaves the heads of the fasteners vulnerable to damage in case they are hit on heavy impact between the ship and a dock, as they may be driven into the hull upon impact, resulting in severe damage to the ship. This vulnerability is also present when attaching studs are welded to the hull. The bolting method of attachment is also costly; and damage resulting from direct impact with the bolts or studs is very expensive to repair, as is replacement of the fenders.

SUMMARY OF THE INVENTION

In order to overcome the shortcomings heretofore encountered, particularly in marine fenders, therefore, it is a primary object of this invention to provide a fender which is conformable to either a flat or contoured surface, such as a hull surface, and weldable thereto.

Another object of the invention is to provide a marine fender easily installed on the bow or stem of a ship by welding and easily removed, either in whole or in part, for replacement of damaged or worn fenders or portions thereof.

An additional object of the invention is to provide a marine fender easily and quickly installable, not requiring the use of mechanical fasteners or cables.

A further object of the invention is to provide a resilient fender which makes maximum use of the inherent resilient qualities of its elastomeric components.

Briefly, the invention resides in a fender to be mounted by welding on the surface of a metal member and including: an elongated, resilient elastomeric pad and a plurality of rigid metal plates affixed to it, adjacent plates being longitudinally spaced from each other with the pad providing a flexible section extending between the adjacent plates, the plates having lateral portions projecting outwardly from opposite sides of the pad, and the portions adapted to be welded to the metal member.

BRIEF DESCRIPTION OF THE DRAWINGS

FIG. 5 is a view similar to that of FIG. 4, of another form of the invention, the fender being preformed to the curvature of the surface to which it is affixed;

FIG. 6 is a plan view of still another form of conformable fender according to the invention;

FIG. 7 is a side elevation view of the fender of FIG. 6, shown attached to a hull of a ship, shown in section;

FIG. 8 is an enlarged transverse sectional view of the fender of FIGS. 6 and 7, taken on the line 8—8 of FIG. 6, looking in the direction of the arrows; and FIG. 9 is a side elevational view of the fender of FIGS. 6, 7, and 8 showing it conformed to a curved portion of a ship's hull, shown in section, and attached thereto.

DESCRIPTION OF THE PREFERRED EMBODIMENTS

Figure 1:
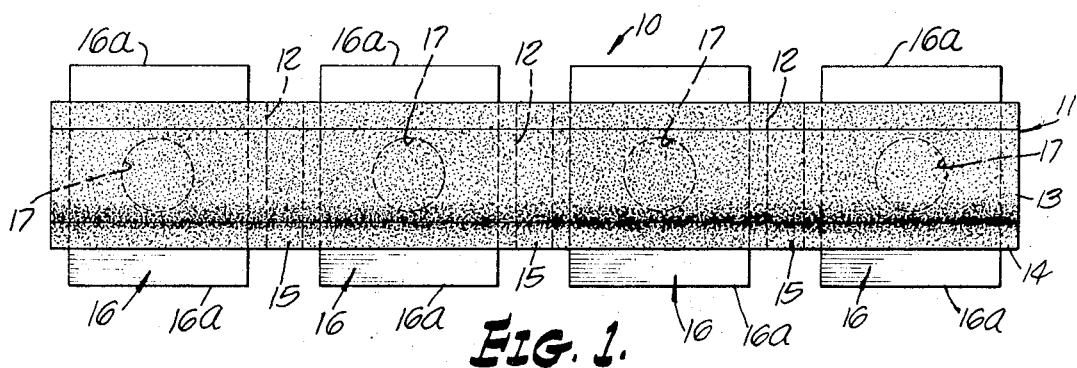
FIG. 1 is a plan view of a conformable fender of this invention.
Figure 2:
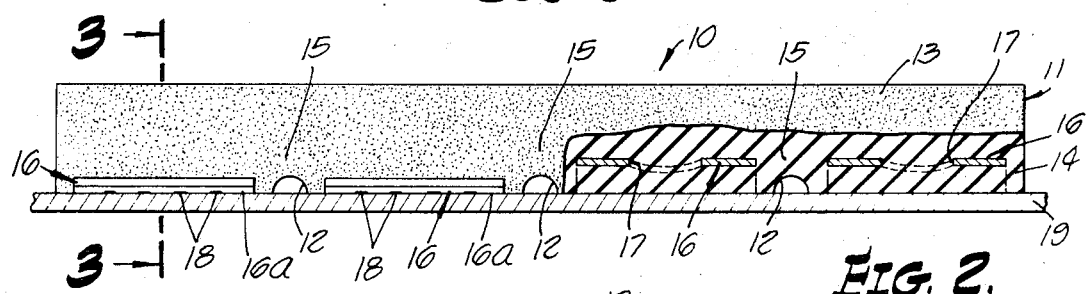
FIG. 2 is a side elevation view of the fender of FIG. 1, partly in section, and shown attached to the hull of a ship.
Figure 3:
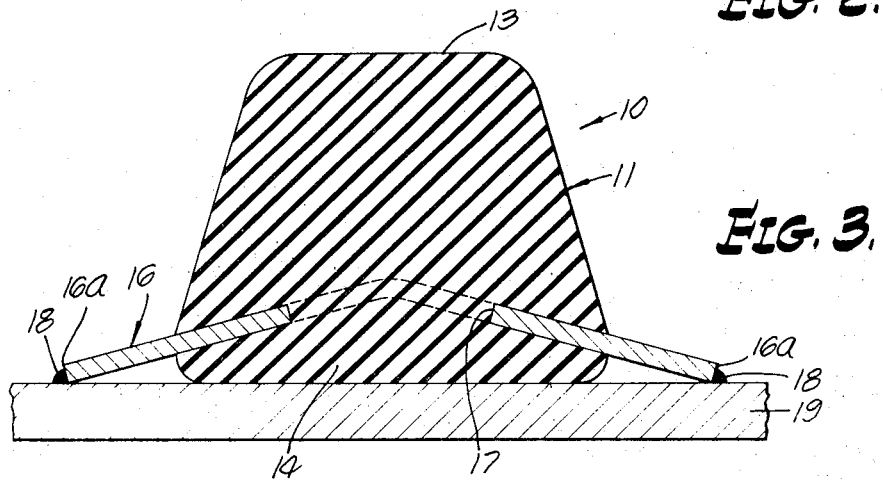
FIG. 3 is an enlarged transverse sectional view of the fender, taken on the line 3—3 of FIG. 2.
Figure 4:
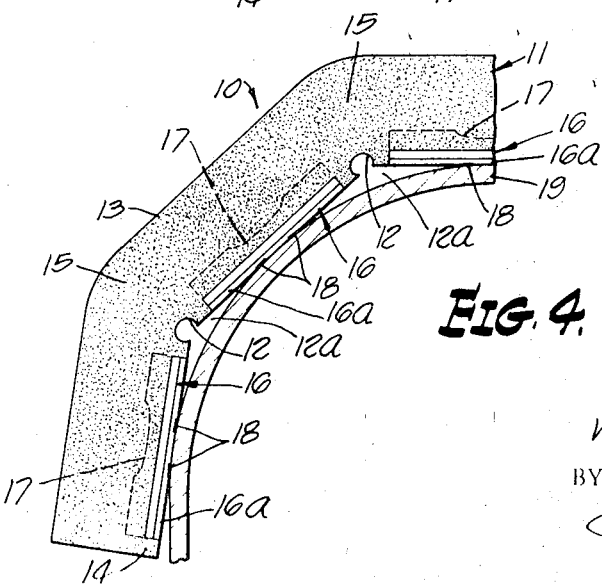
FIG. 4 is a side elevational view of the fender showing it conformed to a curved portion of a ship's hull, shown in section, and attached thereto.

Referring to FIG. 1, there is shown an elongated fender structure 10 having a resilient body portion or pad 11, molded of rubber or other resilient or elastomeric material with a crown portion 13 and a wider base portion 14, into which are molded spaced metal reinforcing insert plates 16, which may vary in number, depending on the length of the fender 10. The rigid plates 16 are generally bent in the form of a V or arch so that their lateral portions or ends 16a extending beyond the body 11 are approximately even with the bottom surface of the base 14 and their crests are embedded in the pad 11. The inserts 16 are adhesively bonded to the elastomeric material of the body 11, the bond and resilience being enhanced by connection of the crown and base portions 13 and 14 through openings or holes 17 in the crests of the base plates 16. The views of the fender 10 in FIGS. 2, 3 and 4 illustrate how it may be affixed to the hull or bow 19 of a towboat or push boat by tack welds 18 welding the ends 16a of the plates 16 to the hull surface 19. FIG. 4 shows the conformability of the bumper or fender 10 to a curved portion of the hull 19 by flexing of the body 11 at its elbow joints 15, the flexibility being enhanced by the transverse grooves 12 between the adjacent spaced plates 16 through the base 14 of the elastomeric body 11. The angular bend at the elbow or flexible section 15 provides a cavity 12a between the hull 19 and the base portion 14 into which the rubber of the body 11 may flow on impact of the crown 13 with another object, the size of the cavity 12a depending on the width of the plates 16. It should be noted that FIG. 4 depicts an exaggerated or extreme configuration of the fender 10 in which the plates 16 are relatively wide, and that the narrower the spaced plates 16 the smaller will be the cavity 12a and the more conformed or concentric the surfaces of the pad 11 with the surface of the hull 19.

In FIG. 5 is depicted another form of conformable fender, designated 20, which is contoured to fit the curved portion of the ship's hull 19. It has a resilient body portion 21 with a crown 23 and base 24, into which are molded arched reinforcing insert plates 26, having lateral portions or ends 26a extending beyond the body 21 for attachment by welds 28 to the curved bow 19 of the ship. The metal inserts 26 are adhesively bonded to the elastomeric material or rubber of the body 21, the bond and resilience being enhanced by connection of the crown and base portions 23 and 24 through holes 27 in the base plates 26. Flexibility to adapt the fender 21 to varying contours of the bow 19 is provided at the flexible sections or elbow joints 25 between the adjacent plates 26, the flexibility being enhanced by the transverse grooves 22 through the base 24; the grooves 22 also provide a space into which rubber may flow on impact of the crown 23 with another object, thus making the bumper 21 more resilient and resistant to shocks.

In FIGS. 6 to 9 is depicted still another form of conformable fender, designated 30. It has a resilient body portion or pad 31 with a crown 33 and base 34, onto which are molded and adhesively bonded a plurality of spaced flat metal plates 36, having ends or lateral portions 36a extending beyond the body 31 for attachment by welds 38 to the bow 19 of the ship. Flexibility to adapt the fender 31 to varying contours of the hull 19 is provided at the elbow joints or flexible sections 35 between the adjacent plates 36, the flexibility being enhanced by the transverse grooves 32 through the base 34. FIG. 9 shows the conformability of the bumper 30 to a curved portion of the bow 19 of the ship by flexing of the body 31 at its elbow joints 35, the angular bend providing a cavity 32a between the hull 19 and the base portion 34 into which the rubber of the body 31 may flow on impact of the crown 33 with another object.

In a typical installation of the conformable fenders 10 on the curved surfaces of a towboat or tugboat to reduce the shock on collision or impact of the towboat in its movement or its usual service in pushing a barge, the fenders 10 are aligned in parallel spaced groupings as on the leading curved surfaces of the bow 19, then the ends 16a of the plates 16 protruding from the rubber body 11 affixed by tack welds 18 to the metal hull 19. By using tack welds 18 at the extremities 16a, away from the elastomeric body 11, the rubber-to-metal bond is not adversely affected by the heat of welding. Conversely, to remove the fenders 10 for replacement after they are worn, requires only a re-application of heat to cut the welds 18, and the surface 19 is ready for new fenders 10. Since the fenders 10 have spaces or flexible rubber elbow joints between the adjacent plates 16, they may be cut into any desired length for installation; and only worn portions, rather than the whole fender, need be removed for replacement.

By having the body 11 of the bumper 10 crowned, with the crown 13 narrower than the base 14, there is thus provided a tapered shape with more resistance to side or glancing impacts, and more space between the bodies 11 of the aligned fenders 10 on the hull 19 for welding the base ends 16a thereto. Additionally, having the surface of the base 14 substantially in the same plane as the base plate ends 16a provides support by both the reinforcing plate 16 and the rubber base 14 resting against the hull 19 to resist pressures and blows exerted against the crown 13 of the fender 10. The holes 17 also provide communication between the crown portion 13 and the base portion 14 so that the whole body 11 is able to absorb the shocks of impacts, thus providing a more rugged and resilient fender and a longer service life therefor. The fender 10 is adaptable or conformable to almost any contour of the hull 19, from flat to severe curves, may be twisted to conform it to warped surfaces and can adapt to distortions of the surfaces which may occur in service, the elbow joints 15 providing the necessary flexibility as described above.

The installation and use of the modified forms of the invention as described hereinabove, fender 20 as depicted in FIG. 5 and fender 30 as depicted in FIGS. 6–9, are quite similar; and they also have advantages corresponding to those discussed above in relation to the fenders 10.

While the description above refers primarily to the use of the fenders of this invention as applied to towboats or tugboats, they may be applied with similar advantages in other installations such as on other types of ships for use as bumpers, on docks and wharves, barges, trucks and truck docks, and similar applications.

Additionally, while three forms of the invention have been shown and described, these forms are merely illustrative, and changes could be made without departing from the scope of this invention as set forth in the claims. For example, the pad 11,21,31 may be perforated or hollow to vary its resilience and bulk.

I claim:

1. A protective fender adapted for connection to conform with a structure having an uneven surface comprising: a plurality of metal support plates disposed with closely spaced edges to form an elongated array of plates and with each of said plates having plate ends adapted to be individually fixed to a respective portion of said uneven surface; and an undivided and flexible resilient body pad fixed to and merged with each respective plate and disposed along said array of plates to permit said body pad to bend and accommodate the respective position of each said plate when fixed to said surface, said plate ends projecting sufficiently away from said pad to permit attachment of said plates to said surface.

2. A fender as defined in claim 1 wherein said plates are adhesively bonded to said pad.

3. A fender as defined in claim 1 wherein the lateral portions of said plates are curved in general conformity to the surface on which the fender is to be mounted.

4. A fender as defined in claim 1 wherein each said plate has its central portion embedded in said pad and said central portion provides an opening through which the material of the pad on one side of the opening is joined to the material of the pad on the other side of the opening.

5. A fender as defined in claim 4 wherein said plates are arched and said plate ends lie in a plane including a surface of said pad.

6. A fender as defined in claim 1 wherein said flexible section provides a transverse groove adjoining said adjacent ones of said plates.

7. A fender as defined in claim 1 wherein a surface of each of said plates is bonded to an exterior surface of said pad.

8. A fender as defined in claim 1 wherein each said plate end is fixed to said surface by welding to join said fender and said structure into an integral unit.

9. A fender as defined in claim 8 wherein each said plate has its central portion embedded in said pad and said central portion provides an opening through which the material of the pad on one side of the opening is joined to the material of the pad on the other side of the opening.

10. A fender as defined in claim 9 wherein said plates are arched and said plate ends lie in a plane including a surface of said pad.

* * * * *